United States Patent
Yoshida et al.

(10) Patent No.: US 10,960,599 B2
(45) Date of Patent: Mar. 30, 2021

(54) METHOD OF MANUFACTURING GASKET

(71) Applicant: NOK CORPORATION, Tokyo (JP)

(72) Inventors: Satomi Yoshida, Fujisawa (JP);
Takahiro Hayashi, Fujisawa (JP)

(73) Assignee: NOK CORPORATION

( * ) Notice: Subject to any disclaimer, the term of this patent is extended or adjusted under 35 U.S.C. 154(b) by 218 days.

(21) Appl. No.: 15/739,120

(22) PCT Filed: Jun. 10, 2016

(86) PCT No.: PCT/JP2016/067319
§ 371 (c)(1),
(2) Date: Dec. 21, 2017

(87) PCT Pub. No.: WO2017/002580
PCT Pub. Date: Jan. 5, 2017

(65) Prior Publication Data
US 2018/0178441 A1 Jun. 28, 2018

(30) Foreign Application Priority Data

Jun. 29, 2015 (JP) .............................. JP2015-129818
Nov. 2, 2015 (JP) .............................. JP2015-215518

(51) Int. Cl.
*B29C 59/02* (2006.01)
*B29C 35/08* (2006.01)
*B29C 33/00* (2006.01)
*B29C 37/02* (2006.01)
*B29C 43/38* (2006.01)
(Continued)

(52) U.S. Cl.
CPC ........ *B29C 59/026* (2013.01); *B29C 33/0055* (2013.01); *B29C 35/0805* (2013.01);
(Continued)

(58) Field of Classification Search
CPC ... B29C 59/026; B29C 33/0055; B29C 37/02; B29C 43/38; B29C 43/01; B29C 35/0805; F16J 15/108; B29L 2031/265
See application file for complete search history.

(56) References Cited

U.S. PATENT DOCUMENTS

2015/0343676 A1   12/2015   Shimazoe et al.

FOREIGN PATENT DOCUMENTS

DE   19538290    *  4/1997   ............. B29C 43/18
DE   19538290 A1 *  4/1997   ............. B29C 43/18
(Continued)

OTHER PUBLICATIONS

English Translation of JP-2008168448-A.*
(Continued)

*Primary Examiner* — Alison L Hindenlang
*Assistant Examiner* — Olukorede Esan
(74) *Attorney, Agent, or Firm* — Harness, Dickey & Pierce, P.L.C.

(57) ABSTRACT

A process for producing gaskets by curing a liquid molding material applied over a plate by a dispenser, wherein in order to improve accuracy in the cross-sectional shape and/or height of the gaskets, the process comprises the steps of: using a dispenser to coat the upper surface of a plate with a liquid molding material, and form a coating layer extending endlessly in a prescribed pattern; and overlapping a molding jig on the plate, the molding jig having in a lower surface a molding groove extending endlessly in a prescribed pattern corresponding to the coating layer, correcting the cross-sectional shape of the coating layer to a cross-sectional shape that corresponds to the molding groove, and curing the coating layer.

4 Claims, 10 Drawing Sheets

(51) Int. Cl.
- *B29C 43/18* (2006.01)
- *F16J 15/10* (2006.01)
- *H01M 8/0284* (2016.01)
- *H01M 8/0276* (2016.01)
- *F16J 15/12* (2006.01)
- *H01M 8/0286* (2016.01)
- *F16J 15/14* (2006.01)
- *B29L 31/26* (2006.01)
- *B29L 31/34* (2006.01)
- *H01M 8/0273* (2016.01)

(52) U.S. Cl.
CPC ............ *B29C 37/02* (2013.01); *B29C 43/18* (2013.01); *B29C 43/38* (2013.01); *F16J 15/102* (2013.01); *F16J 15/108* (2013.01); *F16J 15/123* (2013.01); *F16J 15/14* (2013.01); *H01M 8/0276* (2013.01); *H01M 8/0284* (2013.01); *H01M 8/0286* (2013.01); *B29C 35/0888* (2013.01); *B29C 2035/0827* (2013.01); *B29L 2031/265* (2013.01); *B29L 2031/3468* (2013.01); *H01M 8/0273* (2013.01); *Y02P 70/50* (2015.11)

(56) References Cited

FOREIGN PATENT DOCUMENTS

| | | |
|---|---|---|
| DE | 19538290 A1 | 4/1997 |
| EP | 0416653 A2 | 3/1991 |
| EP | 0558033 A1 | 9/1993 |
| EP | 1619429 A1 * | 1/2006 ............... F16J 15/14 |
| EP | 1619429 A1 | 1/2006 |
| JP | 2000-302160 A | 10/2000 |
| JP | 2006-038013 A | 2/2006 |
| JP | 2008-168448 A | 7/2008 |
| JP | 2010-190237 A | 9/2010 |
| JP | 2014-211185 A | 11/2014 |

OTHER PUBLICATIONS

English translation of DE 19538290 (Year: 1997).*
Extended European Search Report for Patent Application No. EP16817689.9, dated Jun. 7, 2018 (7 pages).
International Search Report (in Japanese and English) issued in PCT/JP2016/067319, dated Jul. 26, 2016; ISA/JP.

* cited by examiner

METHOD OF MANUFACTURING GASKET

CROSS-REFERENCE TO RELATED APPLICATIONS

This application is a U.S. National Stage Application of International Application No. PCT/JP2016/067319, filed on Jun. 10, 2016, and published in Japanese as WO 2017/002580 A1 on Jan. 5, 2017 and claims priority to Japanese Application Nos. 2015-129818, filed on Jun. 29, 2015 and 2015-215518, filed on Nov. 2, 2015. The entire disclosures of the above applications are incorporated herein by reference.

BACKGROUND OF THE INVENTION

Field of the Invention

The present invention relates to a method of manufacturing a gasket by curing an application layer of a liquid molding material which is applied to an upper surface of a plate body by a dispenser.

Description of the Conventional Art

As one kind of seal parts, there has been a substrate integrated gasket 10 in which a gasket 2 made of a rubber elastic body (a rubber material or a synthetic resin material having a rubber elasticity) is integrally formed on an upper surface of a substrate 1, as shown in FIGS. 16A and 16B. As a typical example, the substrate integrated gasket in which the gasket constructed by the rubber elastic body is integrally formed on the upper surface of the substrate such as a separator which is a component of a fuel battery cell is used as a sealing means for sealing fuel gas and oxide gas in a fuel battery having a structure in which a lot of fuel battery cells are laminated.

As a method of manufacturing the substrate integrated gasket 10 mentioned above, there has been known a method of integrating the gasket 2 with the substrate 1 at the same time of forming the gasket 2 shown in FIGS. 16A and 16B by applying a liquid rubber to an upper surface of the substrate 1 in an endless manner according to a predetermined pattern by using a dispenser, and crosslinking and curing the application layer of the liquid rubber (refer, for example, to the following prior art documents).

However, the liquid rubber applied by using the dispenser is formed into a dripping shape (a protruding shape like a curved surface) due to a wetting property and a surface tension in a rising end portion thereof from an upper surface of the substrate 1. Therefore, the gasket 2 obtained by crosslinking and curing the liquid rubber in this shape has portions 2a which is short on height in both sides in a width direction as shown in FIG. 17, and is unstable in a cross sectional shape and a height precision. As a result, there have been pointed out problems that there is fear that a sealing performance is unstable, and a cross sectional shape is limited.

Further, according to the method as mentioned above, the same problems are generated even in a rubber-only type in which the gasket 2 is not integrated with the substrate 1.

The present invention is made by taking the above points into consideration, and a technical object of the present invention is to improve precision of a cross sectional shape and a height of a gasket in a method of manufacturing the gasket by curing an application layer of a liquid molding material which is applied to a plate body by a dispenser.

SUMMARY OF THE INVENTION

The present invention employs the following means for achieving the technical object mentioned above.

More specifically, a method of manufacturing a gasket according to the invention of a first aspect includes a step of applying a liquid molding material to an upper surface of a plate body by a dispenser and forming an application layer which extends in an endless manner with a predetermined pattern, and a step of lapping a molding jig over the plate body, correcting a cross sectional shape of the application layer to a cross sectional shape corresponding to the molding groove and curing the application layer, the molding jig having in a lower surface thereof a molding groove which extends in an endless manner according to a predetermined pattern corresponding to the application layer.

According to the method mentioned above, the application layer of the liquid molding material applied onto the upper surface of the plate body according to the predetermined pattern by the dispenser is corrected to the cross sectional shape corresponding to the cross sectional shape of the molding groove in the lower surface thereof by the molding jig which is lapped over the plate body, and the application layer is cured in this state to form the gasket. As a result, the gasket having the cross sectional shape with a high precision is formed.

Further, the present invention may further employ the following means for achieving the technical object mentioned above.

More specifically, a method of manufacturing a gasket according to a second aspect is the method described in the first aspect, wherein the liquid molding material is constructed by an ultraviolet curable liquid rubber, the molding jig is constructed by a transparent plate, and the curing of the application layer is achieved by irradiating ultraviolet light to the application layer via the molding jig.

According to the method, it is possible to cure by irradiating the ultraviolet light to the application layer of the ultraviolet curable liquid rubber from the above of the molding jig after lapping the molding jig over the plate body. Therefore, it is possible to widely shorten a molding time of the gasket.

Further, a method of manufacturing a gasket according to the invention of a third aspect is the method described in the first or second aspect, wherein the molding jig has a burr groove which can form burrs by the liquid molding material extruded out of the inner side of the molding groove.

According to the method mentioned above, the liquid molding material protruding from the inner side of the molding groove in the molding jig is retained within the burr groove when the molding jig is lapped over the plate body, and forms the burr on the basis of the curing of the liquid molding material, and the burr can be separated and removed from the gasket.

Further, a method of manufacturing a gasket according to the invention of a fourth aspect is the method described in the third aspect, wherein the burr groove is structured such as to form the burrs at a position which is away from a bonded portion between the plate body and the liquid molding material.

According to the method mentioned above, the burrs generated by the liquid molding material protruding from the inner side of the molding groove in the molding jig are formed at the position which is away from the bonded portion between the plate body and the liquid molding material. As a result, it is possible to effectively prevent the plate body and the gasket from being peeled when the burrs are separated and removed from the gasket.

Effect of the Invention

On the basis of the method of manufacturing the gasket according to the present invention, the cross sectional shape and the height of the application layer in the liquid molding material by the dispenser are improved in precision. As a result, it is possible to obtain the gasket which can achieve a stable sealing performance.

BRIEF EXPLANATION OF THE DRAWINGS

FIGS. 16A and 16B show an example of a substrate integrated gasket, in which FIG. 16A is a plan view and FIG. 16B is a cross sectional view along a line B-B' in FIG. 16A.

DETAILED DESCRIPTION OF PREFERRED EMBODIMENTS

A description will be given below of a preferable embodiment in which a method of manufacturing a gasket according to the present invention is applied to manufacturing of a substrate integrated gasket 10 shown in FIGS. 16A and 16B, with reference to the accompanying drawings. FIGS. 1 to 4 show a first embodiment.

Figure 1:
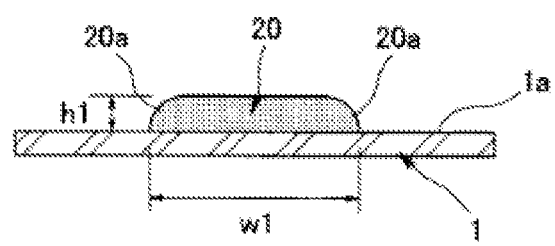
FIG. 1 is an explanatory view showing a state in which an application layer is formed on a substrate by a dispenser, in a first embodiment of a method of manufacturing a gasket according to the present invention.
Figure 16A:
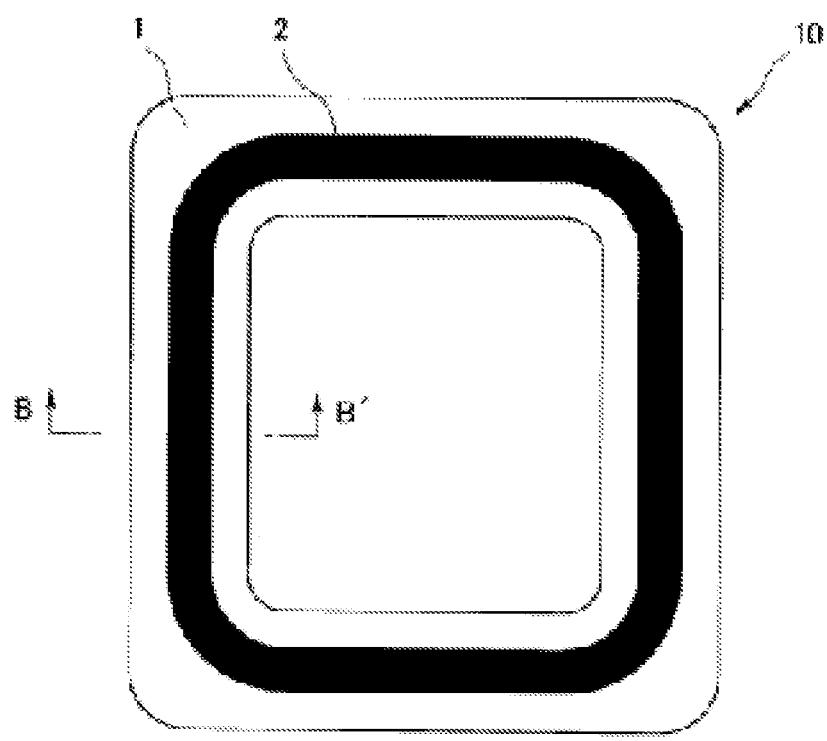

In the first embodiment, first of all, an application layer 20 is formed by applying a thermosetting liquid rubber onto an upper surface 1a of a substrate 1 constructed by a metal plate in an endless manner with a predetermined pattern corresponding to a planar shape of a gasket 2, for example, shown in FIG. 16A while using a dispenser (not shown), as shown in FIG. 1. Here, in the case that a liquid rubber which is a material having no self-adhesiveness in relation to the substrate 1 is employed, an adhesive agent is previously applied to the upper surface 1a of the substrate 1. The substrate 1 corresponds to a plate body described in claim 1, and the liquid rubber corresponds to a liquid molding material described in claim 1.

The application layer 20 is assumed to have a width w1 which is slightly greater than a width of the gasket to be formed, and have a height h1 which is slightly greater than a height of the gasket to be formed. Further, the application layer 20 applied by the dispenser forms a dripping shape (a protruding shape like a curved surface) in both ends thereof in a width direction, that is, rising end portions 20a from the upper surface 1a of the substrate 1, on the basis of a wetting property and a surface tension of the liquid rubber in relation to the upper surface 1a of the substrate 1.

Figure 2:
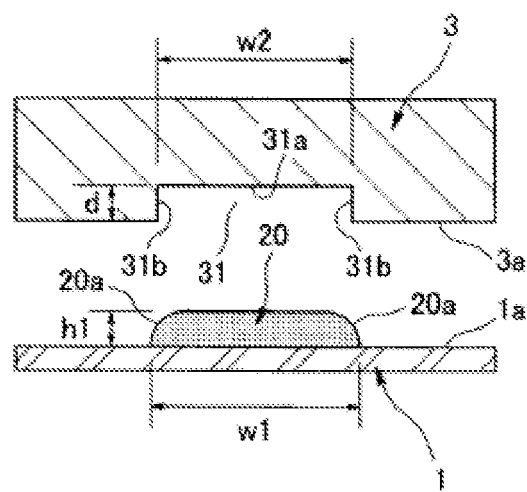
FIG. 2 is an explanatory view showing a process of lapping a molding jig over the substrate in which the application layer is formed, in the first embodiment of the method of manufacturing the gasket according to the present invention.

Next, as shown in FIG. 2, a molding jig 3 is positioned and lapped over the substrate 1 in which the application layer 20 is formed. The molding jig 3 is made of a material having a good heat conduction, and is structured such as to have in a lower surface 3a thereof a molding groove 31 which extends according to a predetermined pattern corresponding to the planar shape of the application layer 20, the molding groove 31 is formed so that a bottom surface 31a is flat and inner side surfaces 31b in both sides in the width direction are vertical to the bottom surface 31a of the molding groove 31 and the lower surface 3a of the molding jig 3, a width w2 thereof is equal the width of the gasket to be formed, that is, a relationship w2<w1 is established, and a depth d thereof is equal to the height of the gasket to be formed, that is, a relationship d<h1 is established. Further, a desired number of air bleeding holes (not shown) extending from the molding groove 31 are preferably formed in the molding jig 3 in such a manner as to prevent the air from remaining in the molding groove 31 and prevent the air accumulation part from being formed when the molding jig 3 is lapped over the substrate 1.

Figure 3:
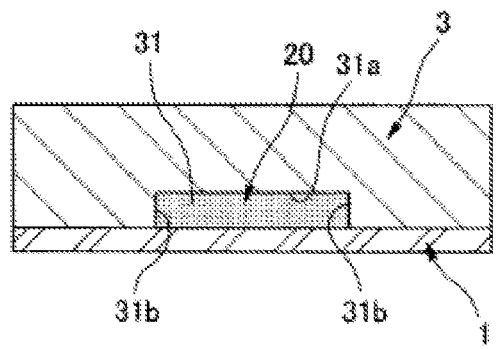
FIG. 3 is an explanatory view showing a state in which the molding jig is lapped over the substrate, in the first embodiment of the method of manufacturing the gasket according to the present invention.

Therefore, in a state in which the molding jig 3 is overlapped in such a manner that the lower surface 3a thereof comes into close contact with the upper surface 1a of the substrate 1, the application layer 20 on the substrate 1 comes to a state in which the application layer 20 is filled in the molding groove 31 as shown in FIG. 3. More specifically, a cross sectional shape of the application layer 20 is corrected to a shape copying the bottom surface 31a and both the inner side surfaces 31b of the molding groove 31.

Figure 4:
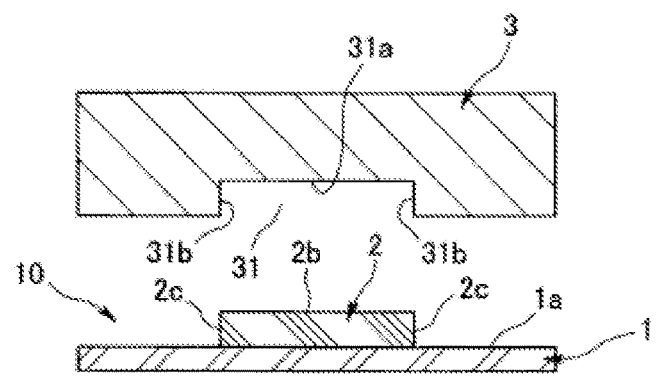
FIG. 4 is an explanatory view showing a process of taking a substrate integrated gasket out of the molding jig, in the first embodiment of the method of manufacturing the gasket according to the present invention.

Next, the application layer 20 made of the thermosetting liquid rubber is crosslinked and cured by feeding the substrate 1 over which the molding jig 3 is lapped to a temperature controlled bath (not shown) and heating it within the temperature controlled bath at a predetermined temperature for a predetermined time. The application layer 20 is formed as the gasket 2 by being cured, and is also bonded integrally to the upper surface 1a of the substrate 1. Further, as shown in FIG. 4, a substrate integrated gasket 10 is taken out by opening the molding jig 3 and the substrate 1 so as to separate them, the substrate integrated gasket 10 being structured, as shown in FIGS. 16A and 16B, such that the gasket 2 constructed by the rubber elastic body is integrally formed in the upper surface 1a of the substrate 1.

The gasket 2 formed as mentioned above has a cross sectional shape having a high precision since the upper surface 2b thereof is formed into the flat shape by the bottom surface 31a of the molding groove 31 in the molding jig 3, and both the side surfaces 2c are formed into the vertical rising surfaces by both the inner side surfaces 31b of the molding groove 31 in the molding jig 3, in the curing process of the application layer 20 mentioned above. As a result, the gasket 2 can achieve a stable performance.

Figure 5:
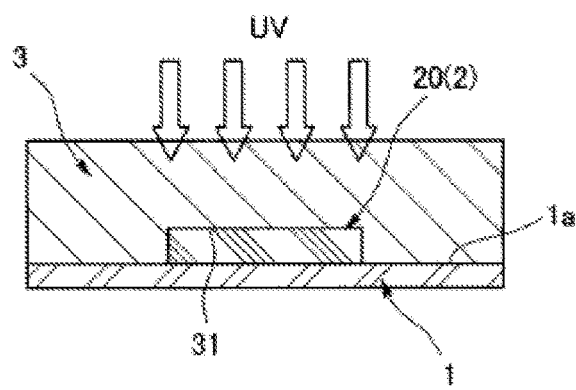
FIG. 5 is an explanatory view showing a state in which an application layer is cured by ultraviolet light, in a second embodiment of the method of manufacturing the gasket according to the present invention.

FIG. 5 shows a step of curing the application layer 20 which is formed on the upper surface 1a of the substrate 1 by the dispenser (not shown) and is made of an ultraviolet curable liquid rubber on the basis of irradiation of ultraviolet light UV, in which the molding jig 3 is made of a transparent material, for example, a glass material, as a preferable second embodiment of the method of manufacturing the gasket according to the present invention.

More specifically, in the second embodiment, the ultraviolet curable liquid rubber is employed as the liquid molding material which is applied to the upper surface 1a of the substrate 1 by the dispenser. Further, the application layer 20 on the substrate 1 is set to a state in which the application layer 20 is filled in the molding groove 31 as shown in FIG. 3, by lapping the molding jig 3 over the substrate 1 in which the application layer 20 made of the ultraviolet curable liquid rubber is formed in such a manner that the lower surface 3a of the molding jig 3 comes into close contact with the upper surface 1a of the substrate 1, as shown in FIG. 1. The ultraviolet light UV is irradiated by an ultraviolet light irradiation device (not shown) from the above of the molding jig 3 after the cross sectional shape of the application layer 20 is corrected to a shape copying the bottom surface 31a and both the inner side surfaces 31b of the molding groove 31. The ultraviolet light UV passes through the transparent molding jig 3, and cures the application layer 20 made of the ultraviolet curable liquid rubber on the basis of energy thereof. As a result, it is not necessary to put the substrate 1 over which the molding jig 3 is lapped in the temperature controlled bath, and the gasket 2 can be formed by curing the application layer 20 for a short time (for example, several tens of second).

After the gasket 2 is formed by crosslinking and curing the application layer 20 on the basis of the irradiation of the ultraviolet light UV, the molding jig 3 and the substrate 1 are opened so as to be separated as shown in FIG. 4. As a result, it is possible to take out the substrate integrated gasket 10 in which the gasket 2 made of the rubber elastic body is integrally formed in the upper surface 1a of the substrate 1 as shown in FIGS. 16A and 16B.

Figure 6:
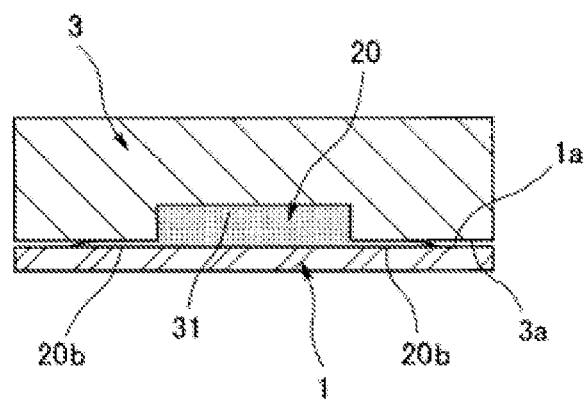
FIG. 6 is an explanatory view showing a process that a liquid molding material within a molding groove in a molding jig protrudes to both sides in a width direction, in the method of manufacturing the gasket according to the present invention.

In each of the embodiments mentioned above, if a part 20b of the application layer 20 within the molding groove 31 of the molding jig 3 is pushed out to both sides in the width direction and is protruded to a gap between the lower surface 3a of the molding jig 3 and the upper surface 1a of the substrate 1 as shown in FIG. 6 when the molding jig 3 is lapped over the substrate 1 in which the application layer 20 is formed as shown in FIG. 2, the cured material forms a thin burr and there is fear that the thin burr removing work becomes troublesome.

Figure 7:
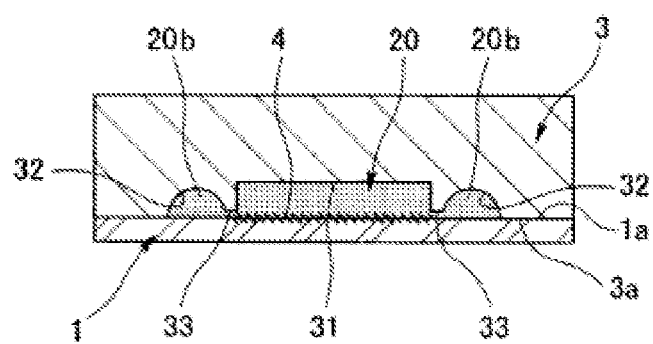
FIG. 7 is an explanatory view showing a state in which a molding jig is lapped over a substrate, in a third embodiment of the method of manufacturing the gasket according to the present invention.

Accordingly, a third embodiment of the method of manufacturing the gasket according to the present invention is structured, as shown in FIG. 7, such that the molding jig 3 has burr grooves 32 which are positioned in both sides of the molding groove 31 in the width direction and have an appropriate depth, and biting portions 33 which are relative convex portions between the burr grooves 32 and the molding groove 31, for preventing the thin burr from being generated. The other structures can be set to be the same as those of the first or second embodiment which has been previously described.

More specifically, in the third embodiment, the adhesive agent 4 is previously applied to an area which forms the bonded portion to the gasket in the upper surface 1a of the substrate 1, in other words, an area which is opposed to the molding groove 31 of the molding jig 3 (an area denoted by small diagonal lines in FIG. 7), and the application layer 20 made of the liquid rubber is thereafter formed in the upper surface 1a of the substrate 1 by the dispenser as shown in FIG. 1. As described previously, the application layer 20 is structured such that the width w1 is greater than the width of the gasket to be formed, and the height h1 is greater than the height of the gasket to be formed.

Next, the application layer 20 on the substrate 1 is set to a state in which the application layer 20 is filled in the molding groove 31 by overlapping the molding jig 3 in such a manner that the lower surface 3a of the molding jig 3 comes into close contact with the upper surface 1a of the substrate 1 as shown in FIG. 7. At this time, a part 20b of the application layer 20 (the liquid rubber) within the molding groove 31 of the molding jig 3 is pushed out to both sides in the width direction and flows into a space between the burr groove 32 of the molding jig 3 and the upper surface 1a of the substrate 1 through a gap between the biting portion 33 and the upper surface 1a of the substrate 1.

Next, in the case that the thermosetting liquid rubber is employed as the liquid molding material, the substrate 1 over which the molding jig 3 is lapped is fed to the temperature controlled bath (not shown) and is heated within the temperature controlled bath at the predetermined temperature for the predetermined time. Alternatively, in the case that the ultraviolet curable liquid rubber is employed as the liquid molding material and the molding jig 3 is made of the transparent material, the ultraviolet light is irradiated from the above of the molding jig 3. According to the above described manner, the application layer 20 (the liquid rubber) on the substrate 1 is crosslinked and cured.

Figure 8:
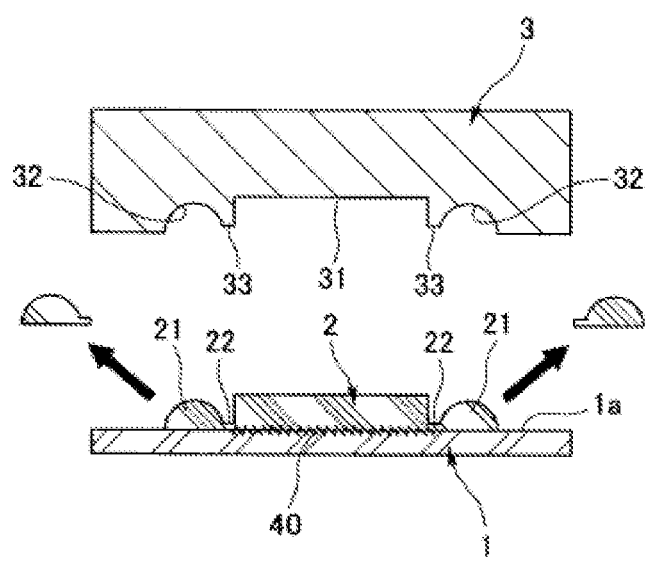
FIG. 8 is an explanatory view showing a step of taking out a product, in the third embodiment of the method of manufacturing the gasket according to the present invention.

After elapse of necessary time for crosslinking and curing the application layer 20, the molding jig 3 and the substrate 1 are opened so as to be separated. As shown in FIG. 8, on the upper surface 1a of the substrate 1, there exist the gasket 2 which is formed by curing the liquid rubber within the molding groove 31 of the molding jig 3 and is integrally bonded to the upper surface 1a by the bonded portion 40, and the burrs 21 which is the cured material of the liquid rubber within the burr grooves 32, in a state in which the gasket 2 and the burrs 21 are connected to each other via the thin connection portion 22 formed by the biting portions 33. Further, since the burrs 21 are not bonded to the upper surface 1a of the substrate 1, the burrs 21 can be easily removed from the gasket 2 in such a manner as to be torn off at the connection portion 22. As a result, it is possible to obtain the substrate integrated gasket 10 in which the gasket 2 made of the rubber elastic body is integrally formed in the upper surface of the substrate 1, as shown in FIGS. 16A and 16B.

Figure 9A:
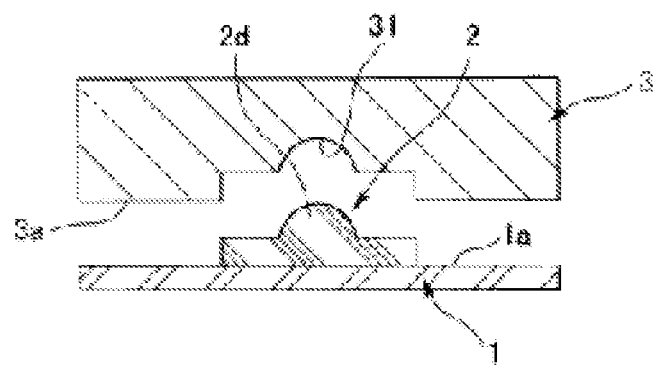
FIGS. 9A, 9B and 9C are explanatory views showing an example of a cross sectional shape of a molding groove in the molding jig in the method of manufacturing the gasket according to the present invention.
Figure 9B:
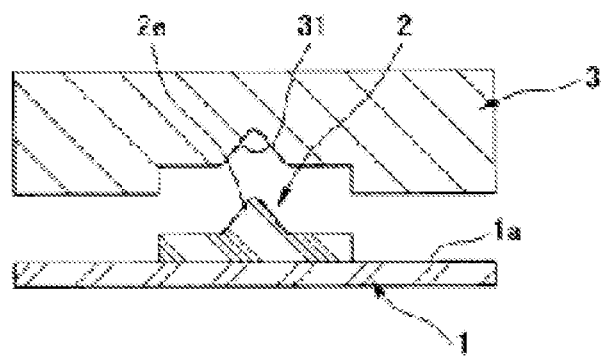
Figure 9C:
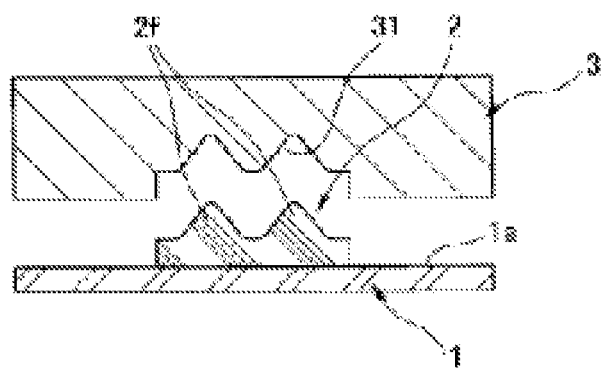

In each of the embodiments mentioned above, the description is given on the assumption that the gasket 2 is formed as the flat gasket having the flat upper surface, however, it is possible to form gaskets having various cross sectional shapes in correspondence to the cross sectional shape of the molding groove 31 of the molding jig 3, for example, a gasket having a seal bead 2d formed into a semi-cylindrical protruding shape as shown in FIG. 9A, a gasket having a seal bead 2e formed into an inverted-V shaped protruding shape in a cross section as shown in FIG. 9B, and a gasket having a plurality of seal beads 2f as shown in FIG. 9C. Therefore, since the gaskets having the complicated shapes can be formed only by changing the processing shape of the molding groove 31 of the molding jig 3, it is possible to correspond to demands for changing the specification at a low cost.

Figure 16B:
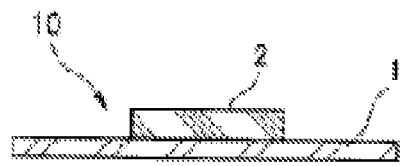
Figure 17:
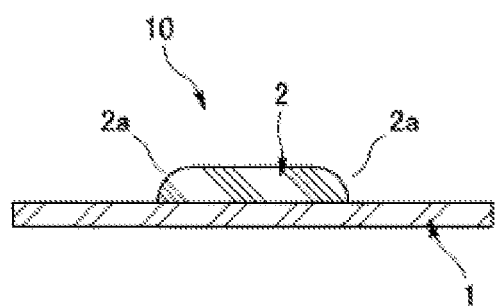
FIG. 17 is an explanatory view showing a cross sectional shape of a substrate integrated gasket which is manufactured according to the prior art.

Further, the embodiments mentioned above are all described as the manufacturing of the substrate integrated gasket 10 in which the gasket 2 constructed by the rubber elastic body is integrally formed in the upper surface 1a of the substrate 1 as shown in FIGS. 16A and 16B, however, the present invention can be also applied to the case that a rubber-only gasket is formed by using a material having no self-adhesiveness for the liquid molding material without application of the adhesive agent to the upper surface 1a of the substrate 1.

Further, according to the previously described third embodiment, the tear-off position (the connection portion 22) is along the bonded portion 40 between the upper surface 1a of the substrate 1 and the gasket 2 when the burrs 21 are removed from the gasket 2 in such a manner as to torn off in the thin connection portion 22 after the molding jig 3 is separated from the substrate 1 as shown in FIG. 8. As a result, the stress concentrated on the connection portion 22 by pulling the burrs 21 directly acts on the bonded portion 40 as a peeling force.

Figure 10:
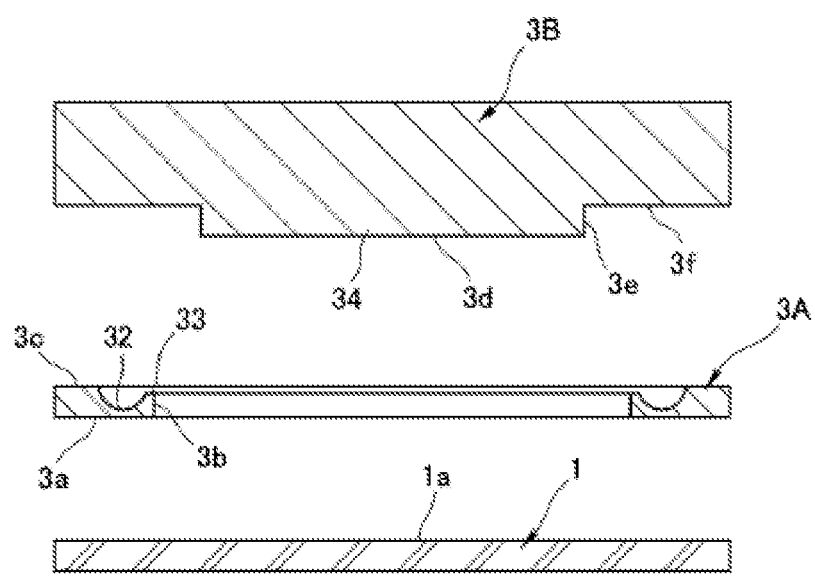
FIG. 10 is an explanatory view showing a substrate and first and second molding jigs, in a fourth embodiment of the method of manufacturing the gasket according to the present invention.

Accordingly, a fourth embodiment of the method of manufacturing the gasket according to the present invention is structured, as shown in FIG. 10, such that a plurality of molding jigs (a first molding jig 3A and a second molding jig 3B) are used, for effectively suppressing the peeling force acting on the bonded portion 40 between the gasket 2 and the substrate 1 when removing the burrs 21.

Figure 11:
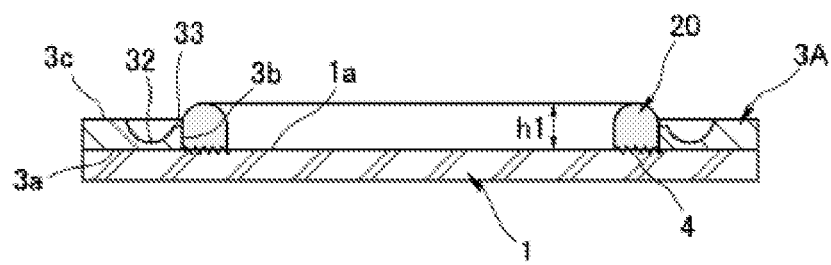
FIG. 11 is an explanatory view showing a state in which an application layer is formed on a substrate over which the first molding jig is lapped, in the fourth embodiment of the method of manufacturing the gasket according to the present invention.

Specifically, the first molding jig 3A is structured, as shown in FIG. 11, such that a lower surface 3a can come into close contact with the upper surface 1a of the substrate 1, an inner peripheral surface 3b is formed into a shape which defines an outer peripheral shape of the gasket to be formed, and an upper surface 3c has the burr grooves 32 having the appropriate depths and the biting portions 33 corresponding to the relative convex portion between the burr grooves 32 and the inner peripheral surface 3b.

Further, the second molding jig 3B has a molding projection 34 in which a lower surface 3d can come into close contact with the upper surface 1a of the substrate 1 and an outer peripheral surface 3e is formed into a shape defining an inner peripheral shape of the gasket to be formed, and is structured such that an outer peripheral side lower surface 3f thereof can come into close contact with the upper surface 3c of the first molding jig 3A.

Figure 12:
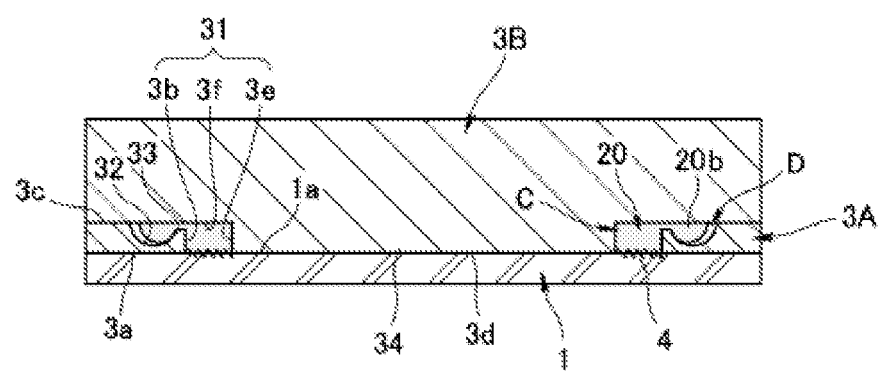
FIG. 12 is an explanatory view showing a state in which the second molding jig is lapped over the substrate in which the application layer is formed, in the fourth embodiment of the method of manufacturing the gasket according to the present invention.

Further, as shown in FIG. 12, the molding groove 31 corresponding to a planar shape and a cross sectional shape of the gasket to be formed is constructed by the inner peripheral surface 3b of the first molding jig 3A and the outer peripheral surface 3e and the outer peripheral side lower surface 3f of the molding projection 34 in the second molding jig 3B which are obtained by positioning the first molding jig 3A and the second molding jig 3B on the substrate 1 and lapping the first molding jig 3A and the second molding jig 3B over the substrate 1. As a result, a gasket molding space C is defined between the molding groove 31 and the upper surface 1a of the substrate 1, and a burr molding space D is defined between the burr groove 32 and the biting portion 33 which are formed in the upper surface 3c of the first molding jig 3A, and the outer peripheral side lower surface 3f of the second molding jig 3B, the burr molding space D being connected to the gasket molding space C and being away from the upper surface 1a of the substrate 1 (the bonded portion 40 between the substrate 1 and the gasket 2 shown in FIG. 12).

Therefore, according to the fourth embodiment, the endless shaped application layer 20 is formed by first of all positioning and lapping the first molding jig 3A over the upper surface 1a of the substrate 1 as shown in FIG. 11, and thereafter applying the liquid rubber along the inner peripheral side of the inner peripheral surface 3b of the first molding jig 3A in the upper surface 1a of the substrate 1 by using the dispenser (not shown). At this time, the adhesive agent 4 is previously applied to an area to be applied the application layer 20 in the upper surface 1a of the substrate 1.

Here, a height h1 of the liquid rubber application layer 20 is higher than a height of the gasket to be formed, and a volume of the liquid rubber application layer 20 is greater than a volumetric capacity of the gasket molding space C which is formed between the molding groove 31 and the upper surface 1a of the substrate 1 by the first molding jig 3A and the second molding jig 3B when the first molding jig 3A and the second molding jig 3B are positioned and lapped over the substrate 1, and is smaller than sum of a volumetric capacity of the burr molding space D which is formed between the burr groove 32 and the biting portion 33 of the first molding jig 3A and the outer peripheral side lower surface 3f of the second molding jig 3B, and the volumetric capacity of the molding space C. Further, the application layer 20 is formed into a dripping shape (a protruding shape like a curved surface) on the basis of the wetting property and the surface tension of the liquid rubber in relation to the upper surface 1a of the substrate 1.

Next, as shown in FIG. 12, the second molding jig 3B is positioned and lapped over the substrate 1 and the first molding jig 3A. As mentioned above, the application layer 20 is higher in the height h1 thereof than the height of the gasket to be formed, and is greater in the volume thereof than the volumetric capacity of the molding space C obtained by the first molding jig 3A and the second molding jig 3B. As a result, a part 20b of the application layer 20 (the liquid rubber) within the gasket molding space C is pushed out through the gap between the biting portion 33 of the first molding jig 3A and the outer peripheral side lower surface 3f of the second molding jig 3B in a process of overlapping the second molding jig 3B, and flows into the burr molding space D between the burr groove 32 of the first molding jig 3A and the outer peripheral side lower surface 3f of the second molding jig 3B.

Figure 13:
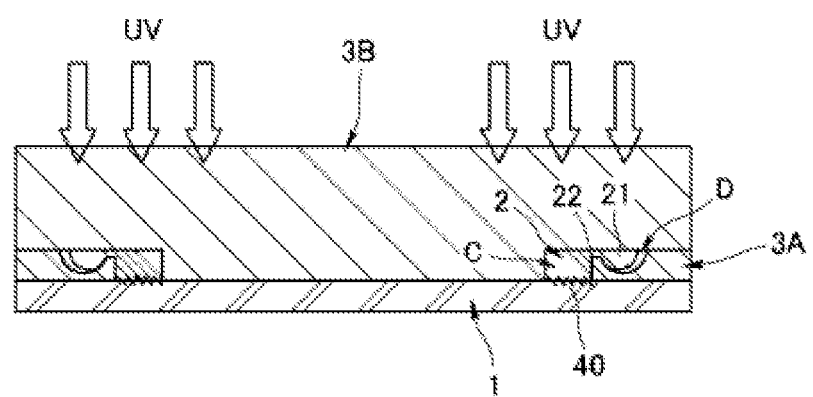
FIG. 13 is an explanatory view showing a step of curing the application layer, in the fourth embodiment of the method of manufacturing the gasket according to the present invention.

Next, in the case that the thermosetting liquid rubber is employed as the liquid molding material, the substrate 1 over which the first molding jig 3A and the second molding jig 3B are lapped is fed to the temperature controlled bath (not shown) and is heated within the temperature controlled bath at the predetermined temperature for the predetermined time. Alternatively, in the case that the ultraviolet curable liquid rubber is employed as the liquid molding material and the first molding jig 3A and the second molding jig 3B are made of the transparent material, the ultraviolet light UV is irradiated from the above of the first molding jig 3A and the second molding jig 3B as shown in FIG. 13. According to the above described manner, the application layer 20 (the liquid rubber) on the substrate 1 is crosslinked and cured.

Accordingly, the gasket 2 integrally bonded to the upper surface 1a of the substrate 1 is formed within the gasket molding space C via the bonded portion 40, and the burr 21 connected to the gasket 2 is formed within the burr molding space D via the thin connection portion 22 obtained by the biting portion 33.

Figure 14:
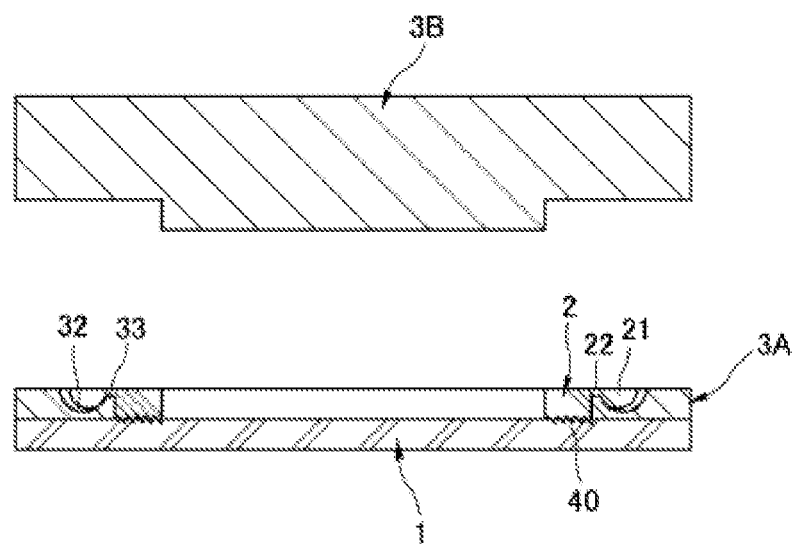
FIG. 14 is an explanatory view showing a state in which the second molding jig is separated from the substrate and the first molding jig, in the fourth embodiment of the method of manufacturing the gasket according to the present invention.
Figure 15:
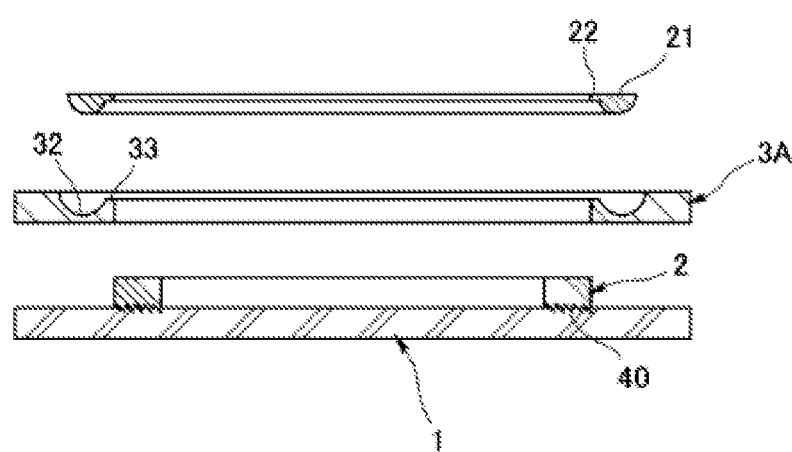
FIG. 15 is an explanatory view showing a step of taking out the product, in the fourth embodiment of the method of manufacturing the gasket according to the present invention.

Next, the second molding jig 3B is opened so as to be separated from the substrate 1 as shown in FIG. 14, and the burr 21 retained in a non-bonded manner to the burr groove 32 of the first molding jig 3A is removed in such a manner as to be torn off in the connection portion 22 on the biting portion 33 as shown in FIG. 15. At this time, since the burr 21 and the connection portion 22 exist at a position which is away from the bonded portion 40 between the gasket 2 and the upper surface 1a of the substrate 1, the stress at the breaking time in the connection portion 22 is hard to act as the peeling force of the bonded portion 40 when the burr 21 is removed by being torn off from the gasket 2, so that it is possible to effectively prevent the gasket 2 from being peeled off from the substrate 1. Further, it is possible to obtain the substrate integrated gasket 10 in which gasket 2 made of the rubber elastic body is integrally formed in the upper surface 1a of the substrate 1, by opening the first molding jig 3A so as to separate from the substrate 1.

Further, in the fourth embodiment, it is also possible to form the gaskets 2 having the various cross sectional shapes as shown in FIGS. 9A to 9C which have been previously described, in correspondence to the cross sectional shape of the molding groove 31 which is constructed by the inner peripheral surface 3b of the first molding jig 3A and the outer peripheral surface 3e and the outer peripheral side lower surface 3f of the molding projection 34 in the second molding jig 3B. Therefore, since the gaskets having the complicated shapes can be formed only by changing the processing shapes of the inner peripheral surface 3b of the first molding jig 3A and the outer peripheral surface 3e and the outer peripheral side lower surface 3f of the molding projection 34 in the second molding jig 3B, it is possible to correspond to the demands for changing the specification at a low cost.

What is claimed is:

1. A method of manufacturing a gasket comprising:
   providing an annular first molding jig to an upper surface of a plate body;
   applying a liquid molding material to the upper surface of the plate body at a location inboard from the annular first molding jig by a dispenser and forming an application layer which endlessly extends along a first predetermined pattern;
   lapping a second molding jig over the first molding jig and the plate body including the application layer, the second molding jig having in a lower surface thereof an annular molding groove configured for receipt of the annular first molding jig and the application layer which endlessly extends along a second predetermined pattern, the second predetermined pattern corresponding to the first predetermined pattern of the application layer;
   correcting a cross sectional shape of the application layer to a cross sectional shape corresponding to the annular molding groove with the second molding jig; and
   curing the application layer,
   wherein the first molding jig in combination with the second molding jig defines a burr groove configured to form a burr by the liquid molding material extruded out of an inner side of the annular molding groove, the burr groove being connected to the annular molding groove by a biting portion that has a decreased volume in comparison to each of the annular molding groove and the burr groove.

2. The method of manufacturing the gasket according to claim 1,
   wherein the liquid molding material is constructed by an ultraviolet curable liquid rubber, the molding jig is constructed by a transparent plate, and the curing of the application layer is achieved by irradiating ultraviolet light to the application layer via the molding jig.

3. The method of manufacturing the gasket according to claim 1, wherein the burr groove is structured such as to form the burr at a position which is spaced apart from a bonded portion between the plate body and the liquid molding material.

4. The method of manufacturing the gasket according to claim 2, wherein the burr groove is structured such as to form the burr at a position which is spaced apart from a bonded portion between the plate body and the liquid molding material.

* * * * *